United States Patent
Drake, Jr. et al.

(10) Patent No.: US 6,895,024 B1
(45) Date of Patent: May 17, 2005

(54) EFFICIENT IMPLEMENTATION OF 1+1 PORT REDUNDANCY THROUGH THE USE OF ATM MULTICAST

(75) Inventors: John E. Drake, Jr., Pittsburgh, PA (US); Joseph C. Kantz, Beaver Falls, PA (US); Daniel S. Nydick, Wexford, PA (US); Dimitris Varotsis, Pittsburgh, PA (US); James A. Meacham, II, Bradford Woods, PA (US)

(73) Assignee: Marconi Communications, Inc., Warrendale, PA (US)

( * ) Notice: Subject to any disclaimer, the term of this patent is extended or adjusted under 35 U.S.C. 154(b) by 0 days.

(21) Appl. No.: 09/417,038

(22) Filed: Oct. 12, 1999

(51) Int. Cl.$^7$ ............................................. H04J 12/56
(52) U.S. Cl. ........................ 370/536; 370/227; 370/228
(58) Field of Search ................................ 370/216, 217, 370/218, 219, 220, 221, 222, 224, 225, 227, 228, 536; 714/4

(56) References Cited

U.S. PATENT DOCUMENTS

| | | | | |
|---|---|---|---|---|
| 4,630,265 A | * | 12/1986 | Sexton | 370/228 |
| 4,633,473 A | * | 12/1986 | Ratchford et al. | 714/4 |
| 4,819,225 A | * | 4/1989 | Hochstein | 370/216 |
| 5,459,724 A | * | 10/1995 | Jeffrey et al. | 370/398 |
| 5,467,348 A | * | 11/1995 | Fujii et al. | 370/399 |
| 5,485,453 A | * | 1/1996 | Wahlman et al. | 370/389 |
| 5,539,744 A | * | 7/1996 | Chu et al. | 370/397 |
| 5,566,203 A | * | 10/1996 | Brief et al. | 375/211 |
| 5,633,868 A | * | 5/1997 | Baldwin et al. | 370/331 |
| 5,838,924 A | * | 11/1998 | Anderson et al. | 370/217 |
| 5,959,972 A | * | 9/1999 | Hamami | 370/228 |
| 6,052,373 A | * | 4/2000 | Lau | 370/387 |
| 6,181,680 B1 | * | 1/2001 | Nagata et al. | 370/248 |

* cited by examiner

Primary Examiner—Wellington Chin
Assistant Examiner—William Schultz
(74) Attorney, Agent, or Firm—Ansel M. Schwartz

(57) ABSTRACT

A switching system. The switching system includes a first switch having a primary receive port and a secondary receive port. The switching system includes a second switch connected to the first switch. The second switch has n receive ports, where n is greater than or equal to 2 and is an integer. The second switch has m transmit ports, where m is greater than or equal to 2 and is an integer. The transmit ports are decoupled from the receive ports. The second switch has a connecting mechanism that includes a multicast mechanism which sends data out a primary transmit port of the m transmit ports to the primary receive port of the first switch to define a primary path, and out a secondary transmit port of the m transmit ports to a secondary receive port of the first switch to define a redundant path to the primary path so that if there is a failure of the primary path to provide the data to the first switch, the data is received by the first switch through the redundant path. The first switch has a mechanism for only accepting the data from the primary path unless the primary path has failed, in which case the data is received by the first switch through the redundant path. A switch. A method of switching data.

21 Claims, 5 Drawing Sheets

NETMOD LOOPBACK

MODES OF OPERATION

- 20 G FULLY REDUNDANT
  - 40 G IS 1+1 FABRIC & PORT SPARED
  - 20 G IS AVAILABLE CAPACITY

- 10 G IS REDUNDANT AND 20 G NON REDUNDANT
  - 20 G IS 1+1 FABRIC & PORT SPARED
  - 20 G IS NON REDUNDANT
  - 30 G AVAILABLE CAPACITY

40 G IS NON REDUNDANT

EFFICIENT IMPLEMENTATION OF 1+1 PORT REDUNDANCY THROUGH THE USE OF ATM MULTICAST

FIELD OF THE INVENTION

The present invention is related to redundant paths for data communication. More specifically, the present invention is related to redundant paths for data communication through the use of multicast within a switch.

BACKGROUND OF THE INVENTION

There are several types of Automatic Protection Switching (APS) defined, in particular 1+1. In 1+1 APS, there are two sets of ports, the transmit primary and receive primary ports, and the transmit secondary and receive secondary ports, with each set of ports connected by a separate physical link. Note that since transmission is bi-directional, each port is simultaneously both a transmit and a receive port. For clarity, however, only one direction will be described.

Data is transmitted by both the primary and secondary transmit ports over two physical links concurrently, but is only received by receive primary port.

There are a variety of soft and hard errors associated with the SONET physical level which will cause APS to trigger a switch from primary to secondary. Soft errors include counts of corrupted data received while hard errors include loss of carrier. When such an error occurs, the receive secondary port is converted to the receive primary port and the receive primary port is converted to the receive secondary port.

In 1+1 unidirectional APS, this is the extent of the protocol, and the transmitting ports are not aware that anything has happened. In 1+1 bidirectional APS, when the receive side switches from the primary to the secondary port, it uses the SONET K1 and K2 bytes in its transmit direction to inform the other side of its decision. The other side is then free to switch its receive port from primary to secondary. This is useful, for example, in the case where the primary physical link has been cut and one side detects the error before the other.

In order to provide 1+1 port redundancy for data connections, it is necessary as part on the establishment of a connection to establish redundant paths through a switch for both directions of the connection. In particular, a connection will have primary and secondary ports for the incoming link as well as primary and secondary ports for the outgoing link, and these need to be cross connected. The terms "incoming" and "outgoing" are used to indicate the link that a connection setup message is received on and the link that the connection setup message is transmitted on, respectively. I.e., there needs to be a path from the incoming primary port to the outgoing primary and secondary ports and a path from the incoming secondary port to the outgoing primary and second ports, as well as a path from the outgoing primary port to the incoming primary and secondary ports and a path from the outgoing secondary port to the incoming primary and secondary ports.

Typically, this would be done by establishing a mesh of point-to-point paths through the switch and replicating data traffic at the point of ingress. For example, data received on the incoming primary port would have to be replicated and copies sent to the outgoing primary and secondary ports.

The present invention replaces the mesh of point-to-point paths with a set of point-to-multipoint paths through the switch, taking advantage of the multicast capabilities of a switch. The present invention improves on typical implementations of 1+1 port redundancy in three ways:

It provides for faster connection setup because four pt-mpt paths are established through the switch rather than eight pt-pt paths.

A single copy of received data transits the switch rather than two copies. This allows unused switch bandwidth to be used for additional non-redundant ports.

It provides for faster switchover because the switchover does not need to be coordinated between the receive and transmit ports within a switch.

SUMMARY OF THE INVENTION

The present invention pertains to a switching system. The switching system comprises a first switch having a primary receive port and a secondary receive port. The switching system comprises a second switch connected to the first switch. The second switch has n receive ports, where n is greater than or equal to 2 and is an integer. The second switch has m transmit ports, where m is greater than or equal to 2 and is an integer. The transmit ports are decoupled from the receive ports. The second switch has a connecting mechanism that includes a multicast mechanism which sends data out a primary transmit port of the m transmit ports to the primary receive port of the first switch to define a primary link, and out a secondary transmit port of the m transmit ports to a secondary receive port of the first switch to define a redundant link to the primary link so that if there is a failure of the primary link to provide the data to the first switch, the data is received by the first switch through the redundant link. The first switch has a mechanism for only accepting the data from the primary link unless the primary link has failed, in which case the data is received by the first switch through the redundant link.

The present invention pertains to a switch. The switch comprises n receive ports, where n is greater than or equal to 3 and is an integer. The switch comprises m transmit ports, where m is greater than or equal to 3 and is an integer. The switch comprises a connecting mechanism connected to the receive ports and the transmit ports. The connecting mechanism comprises a controller which can place the connecting mechanism in either a first mode where the connecting mechanism is fully redundant, a second mode where the connecting mechanism is fully non-redundant, or a third mode where the connecting mechanism is partially redundant and partially non-redundant.

The present invention pertains to a switch. The switch comprises n receive ports, where n is greater than or equal to 2. The switch comprises m transmit ports where m is greater than or equal to 2. The switch comprises a connecting mechanism connected to the transmit ports and the receive ports. The connecting mechanism comprising a multicast mechanism and preferably a controller which establishes primary paths along which data is sent by the multicast mechanism between the transmit ports and receive ports and also establishes redundant paths along which the data is sent by the multicast mechanism between the receive ports and the transmit ports but only allows the data associated with a primary path and its corresponding redundant path to cross the connecting mechanism on only the primary path if the primary path is in a predetermined state, and only cross the connecting mechanism on only the redundant path if the primary path is not in the predetermined state.

The present invention pertains to a switch for switching data. The switch comprises n receive ports, where n is greater than or equal to 2 and is an integer. The switch comprises m transmit ports, where m is greater than or equal to 2 and is an integer. The transmit ports are decoupled, are not aware of whether they are receiving data on the primary or redundant path, from the receive ports. The switch comprises a connecting mechanism comprising a multicast mechanism. The connecting mechanism forms a primary path between both a primary transmit port and a secondary transmit port of the m transmit ports for transmitting data from the multicast mechanism and a primary receive port of the n receive ports for receiving the data, simultaneously with the formation of a redundant path between the primary transmit port and the secondary transmit port of the m transmit ports for transmitting data from the multicast mechanism and a secondary receive port of the n receive ports for receiving the data or primary receive port. If there is a failure of the primary link or primary receive port, the data received by the secondary receive port is transmitted via the redundant path. A primary link connects to the switch via the primary receive port. A first secondary link connects to the switch via the secondary receive port. If there is a failure of the primary link, there is no data received by the primary receive port. The data on the secondary receive link would be multicast to the primary and secondary transmit ports.

The present invention pertains to a method of switching data. The method comprises the steps of forming via multicasting (or via a multicast mechanism) a first primary path between a primary receive port and a primary and a secondary transmit port of a switch. Then there is the step of forming simultaneously via multicasting with the primary path, a redundant path between a secondary receive port and the primary and the secondary transmit port. Next there is the step of receiving data at the primary receive port and the secondary receive port. Then there is the step of transmitting the data through the primary and secondary transmit port from a multicast mechanism of the switch.

BRIEF DESCRIPTION OF THE DRAWINGS

In the accompanying drawings, the preferred embodiment of the invention and preferred methods of practicing the invention are illustrated in which.

DETAILED DESCRIPTION

Figure 1:
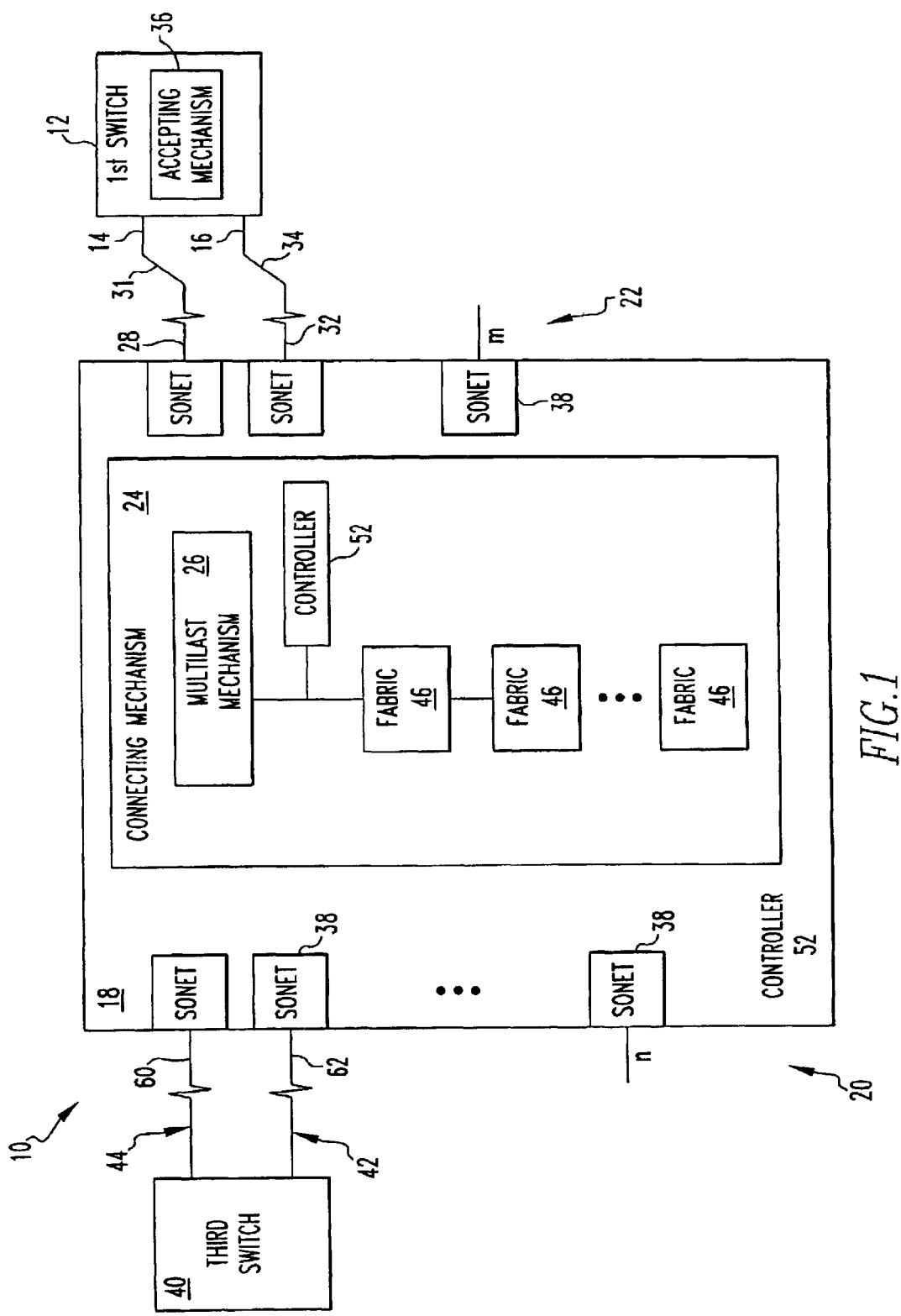
FIG. 1 is a schematic representation of a system of the present invention.

Referring now to the drawings wherein like reference numerals refer to similar or identical parts throughout the several views, and more specifically to FIG. 1 thereof, there is shown a switching system 10. The switching system 10 comprises a first switch 12 having a primary receive port 14 and a secondary receive port 16. The switching system 10 comprises a second switch 18 connected to the first switch 12. The second switch 18 has n receive ports 20, where n is greater than or equal to 2 and is an integer. The second switch 18 has m transmit ports 22, where m is greater than or equal to 2 and is an integer. The transmit ports 22 are decoupled from the receive ports 20. The second switch 18 has a connecting mechanism 24 that includes a multicast mechanism 26 which sends data out a primary transmit port 28 of the m transmit ports 22 to the primary receive port 14 of the first switch 12 to define a primary link 31, and out a secondary transmit port 32 of the m transmit ports 22 to a secondary receive port 16 of the first switch 12 to define a redundant link 34 to the primary link 31 so that if there is a failure of the primary link 31 to provide the data to the first switch 12, the data is received by the first switch 12 through the redundant link 34. The first switch 12 has a mechanism 36 for only accepting the data from the primary link 31 unless the primary link 31 has failed, in which case the data is received by the first switch 12 through the redundant link 34. The accepting mechanism 36 is well known to one skilled in the art.

Preferably, the transmit ports 28 and 32 are not aware whether they receive data from a primary or secondary receive port 60, 62. The connecting mechanism 24 preferably toggles off the secondary receive port 62 so it discards any data it receives if the primary receive port 60 receives the data in a predetermined state, and toggles off the primary receive port 60 if the data received by the primary receive port 60 is not in a predetermined state or the primary link 44 has failed.

Figure 5:
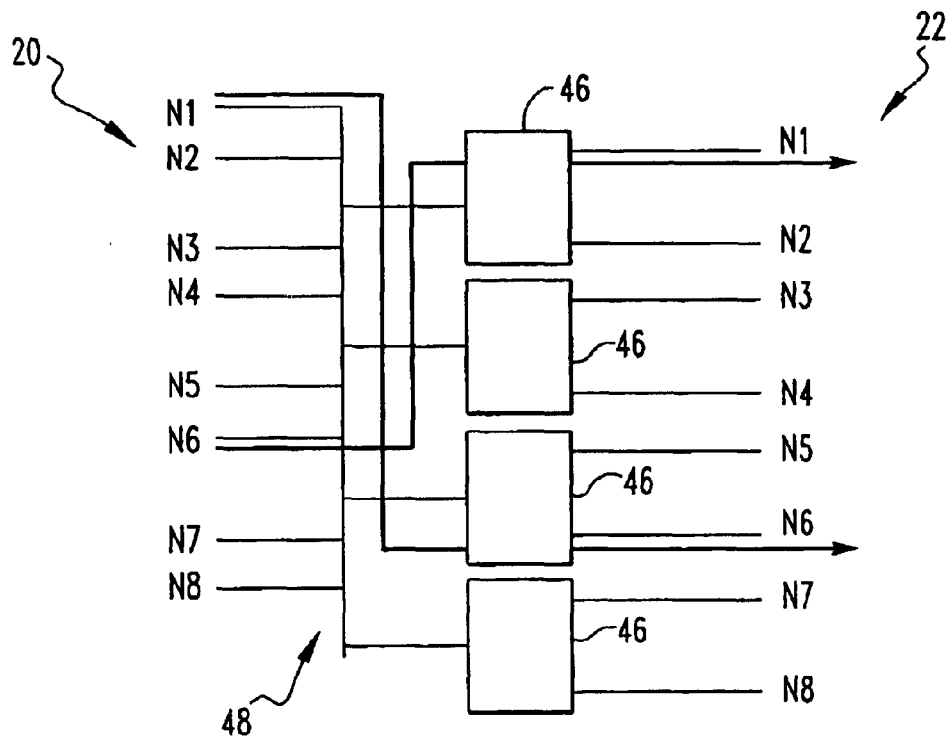
FIG. 5 is a schematic representation of four fabrics connected to a passive backplane.
Figure 6:
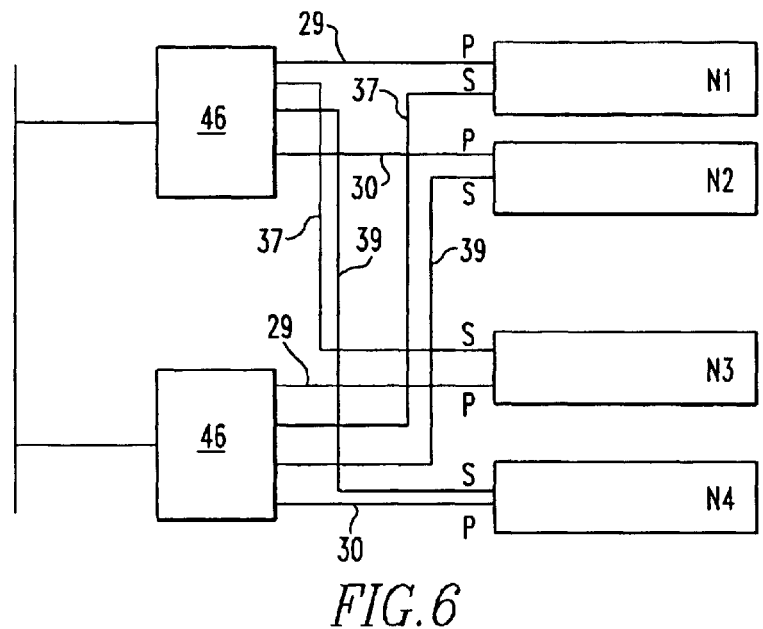
FIG. 6 is a schematic representation of netmod/fabric interfaces.

Preferably, each receive and transmit port are a netmod and wherein the connecting mechanism 24 includes f fabrics 46, where f is greater than or equal to 1 and is an integer, each fabric 46 driving the transmission of at least 2 netmods, as shown in FIGS. 5 and 6. The connecting mechanism 24 preferably includes a passive backplane 48 connected to each netmod and fabric 46 along which data which is received by a netmod is provided to the fabrics 46. Preferably, each fabric 46 drives the transmit direction for two netmods as primary transmit ports 28 and two netmods as secondary transmit ports 32.

The system 18 preferably includes a system 18 controller 52, and the system 18 controller 52 is unaware that the redundant link 42 is redundant to the primary link 44.

Figure 3:
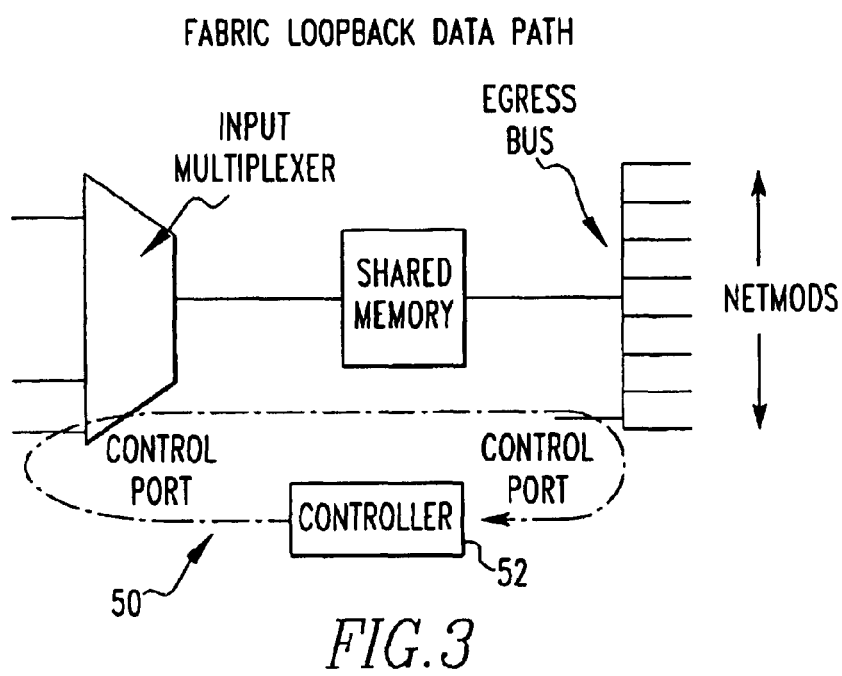
FIG. 3 is a schematic representation of a fabric loopback data path.
Figure 4:
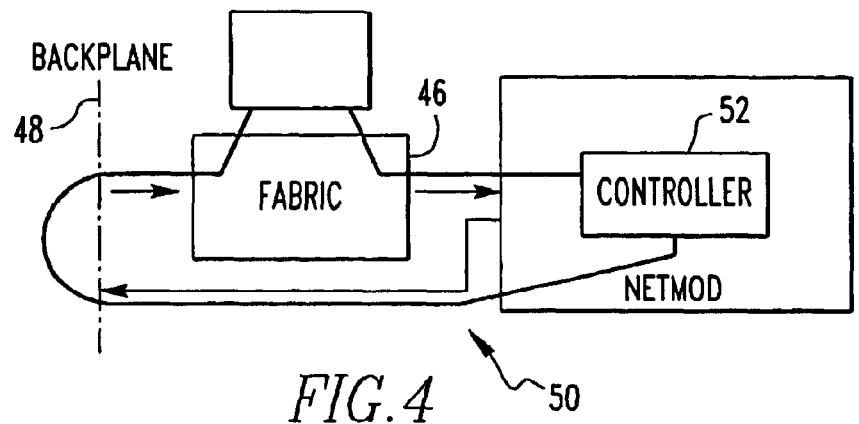
FIG. 4 is a schematic representation of a netmod loopback.

Preferably, the system 18 controller 52 detects intermittent fabric 46 failures by creating a loopback connection 50 from each fabric 46 back to itself and sending a test signal across the loopback connection 50, as shown in FIGS. 3 and 4.

Figure 8:
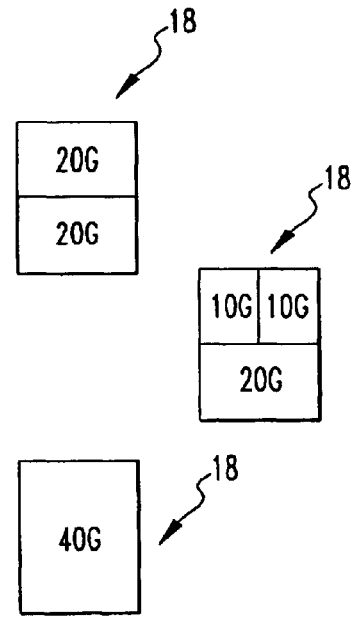
FIG. 8 is a schematic representation of a switch which is in a fully redundant mode, redundant and non-redundant mode, and non-redundant mode.

The present invention pertains to a switch. The switch comprises n receive ports 20, where n is greater than or equal to 3 and is an integer. The switch comprises m transmit ports 22, where m is greater than or equal to 3 and is an integer. The switch comprises a connecting mechanism 24 connected to the receive ports 20 and the transmit ports 22. The connecting mechanism 24 comprises a controller 52 which can place the connecting mechanism 24 in either a first mode where the connecting mechanism 24 is fully redundant, a second mode where the connecting mechanism 24 is fully non-redundant, or a third mode where the connecting mechanism 24 is partially redundant and partially non-redundant, as shown in FIG. 8.

The present invention pertains to a switch for switching data between links. The switch comprises n receive ports 20 for receiving data from respective associated links, where n is greater than or equal to 2. The switch comprises m transmit ports 22 for transmitting data to respective associated links, where m is greater than or equal to 2. The switch comprises a connecting mechanism 24 connected to the transmit ports 22 and the receive ports 20. The connecting mechanism 24 comprising a multicast mechanism 26 and controller 52 which establishes primary paths along which data is sent by the multicast mechanism 26 between the receive ports 20 and the transmit ports 22 and also establishes redundant paths along which data is sent by the multicast mechanism 26 between the receive ports 20 and the transmit ports 22 but only allows the data associated with a primary path to cross the connecting mechanism 24 on only the primary path if the primary path is in a predetermined state, and only cross the connecting mechanism 24 on only the redundant path if the primary path is not in the predetermined state. For instance, if a link to the primary receive port has failed, the primary path is not in the predetermined state.

Preferably, the m transmit ports 22 are not aware whether they receive data from a primary or secondary receive port 60, 62. A primary path is preferably a multicast connection between a primary receive port and a primary transmit port and a secondary transmit port. A redundant path is preferably a multicast connection between a secondary receive port and a primary transmit port and a secondary transmit port.

Figure 2:
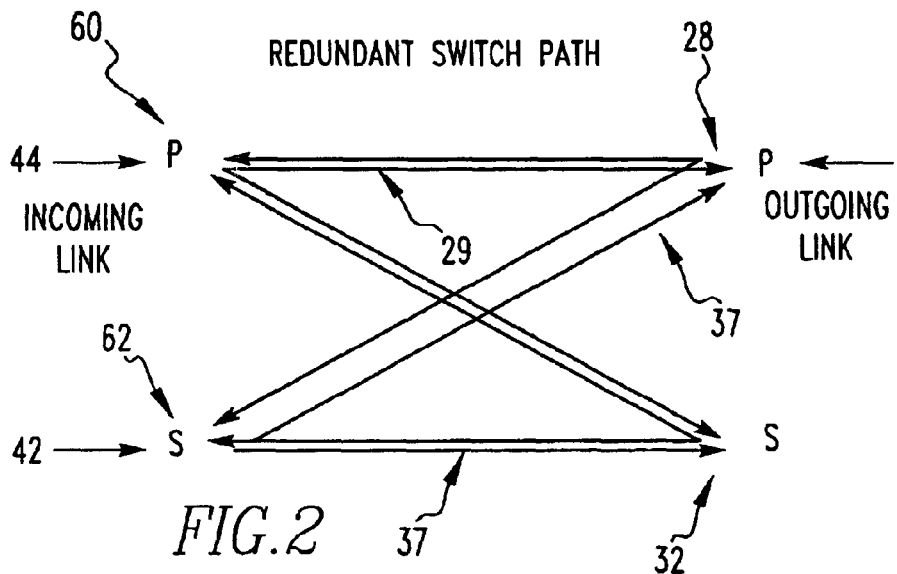
FIG. 2 is a schematic representation of a redundant switch path.

The present invention pertains to a switch for switching data. The switch comprises n receive ports 20, where n is greater than or equal to 2 and is an integer. The switch comprises m transmit ports 22, where m is greater than or equal to 2 and is an integer. The transmit ports 22 are decoupled from the receive ports 20. The switch comprises a connecting mechanism 24 comprising a multicast mechanism 26. As shown in FIG. 2, the connecting mechanism 24 forms a primary path 29 between both a primary transmit port 28 and a secondary transmit port 32 of the m transmit ports 22 for transmitting data and a primary receive port 60 of the n receive ports 20 for receiving the data, simultaneously with the formation of a secondary path 37 between both the primary transmit port 28 and the secondary transmit port 32 of the n transmit ports 22 for transmitting the data and a secondary receive port 62 of the n receive ports 20 for receiving the data so that if there is a failure of the primary link 44, the data received by the secondary receive port 62 is transmitted by the primary transmit port 28 and the secondary transmit port 32 via the secondary path 37. It should be noted that the data crosses the switch fabric only once, which is then transmitted by the primary and secondary transmit ports, with the multicast mechanism copying the data for its transmission out the primary and secondary transmit ports. In this way, use of bandwidth is minimized in the switch fabric for the transmission of the data out more than 1 transmit port. Preferably, the primary path connects the primary receive port with both primary and secondary transmit ports, and the secondary path connects the secondary receive port with both primary and secondary transmit ports.

Preferably, the connecting mechanism 24 toggles off the secondary receive port 62 so it discards any data it receives if the primary receive port 60 receives the data in a predetermined state, and toggles off the primary receive port 60 if the data received by the primary receive port 60 is not in a predetermined state or the primary link 44 has failed. Preferably, the m transmit ports 22 are not aware whether they receive data from a primary or secondary receive port 60, 62. The connecting mechanism 24 is preferably part of an ATM switch that takes advantage of the multicasting capabilities provided for by the ATM switch. When the cell is received by the switch it is stored. When the cell is to be served by the switch, connection information for the cell already in the switch, as is well-known in the art, is accessed. The cell with its connection information is then copied and sent out the primary and secondary transmit ports. By copying the cell and sending it out rather than creating and storing the cell for each transmission, it saves using storage capacity of the switch, and maximizes the usage of bandwidth in the switch.

The present invention pertains to a method of switching data. The method comprises the steps of forming a primary path 29 between a primary receive port 60 and a primary and a secondary transmit port 28, 32 of a switch. Then there is the step of forming simultaneously with the primary path 29, a secondary path 37 between a secondary receive port 62 and a primary and a secondary transmit port 28, 32. Next there is the step of receiving data at the primary receive port 60 and the secondary receive port 62. Then there is the step of transmitting the data through the primary transmit port 28 and the secondary transmit port 32 from a multicast mechanism 26 of the switch. Preferably, after the receiving step, there is the step of discarding the data received at the secondary receive port 62.

In the operation of the preferred embodiment, given that there exists primary/secondary port capabilities, it is necessary as part on the establishment of a connection to establish redundant paths through the switch for both directions of the connection. In particular, a connection will have primary and secondary ports for the incoming link as well as primary and secondary ports for the outgoing link, and these need to be cross connected. The terms 'incoming' and 'outgoing' are used to indicate the link that a connection setup message is received on and the link that the connection setup message is transmitted on, respectively. I.e., there needs to be a path from the incoming primary port to the outgoing primary and secondary ports and a path from the incoming secondary port to the outgoing primary and secondary ports, as well as a path from the outgoing primary port to the incoming primary and secondary ports and a path from the outgoing secondary port to the incoming primary and secondary ports. See FIG. 2.

In particular, if there exists a connection between a primary port on n1 and a primary port on n6, there would be the following paths associated with that connection:

n1 −>(f3, f4)−>(n6, n8)

n3−>(f3, f4)−>(n6, n8), inactive since the port on n3 is a secondary port and is not receiving data n6−>(f1, f2)−>(n1, n3)

n8−>(f1, f2)−>(n1, n3), inactive since the port on n8 is a secondary port and is not receiving data The notation above is meant to indicate that data received from n1 are multicast to both f3 and f4, and that n6 and n8 are receiving data from f3 if it is healthy and from f4 if it is not. Similarly, data received from n6 are multicast to both f1 and f2, and that n1 and n3 are receiving data from f1 if it is healthy and from f2 if it is not. (See FIGS. 5 and 6.)

With the switch internal data paths described above, it is also possible to configure the switch such that only half of it is operating in redundant mode, while the other half is operating in non-redundant mode. This yields a single switch that has simultaneously 10 G of redundant capacity and 20 G of non-redundant capacity. Further, it is possible to have connections between a redundant port and a non-redundant port.

Each primary fabric 46 and its associated netmods (f1, n1, n2) or (f3, n5, n6) are configured to operate in redundant or non-redundant mode. If a fabric 46 and its associated netmods are configured to operate in redundant mode, its associated fabric 46 and netmods (f 2, n3, n4) or (f4, n7, n8) are the corresponding secondaries. Otherwise, they are operated independently.

In the previous example, there was a unicast connection between a port on n1 and a port on n6. If n1 is configured to operate in redundant mode and n6 is configured to operate in non-redundant mode, there would be the following paths associated with that connection:

n1−>(f3)−>(n6)

n3−>(f3)−>(n6), inactive since the port on n3 is a secondary port and is not receiving data n6−>(f1, f2)−>(n1, n3)

In order to make the operation of the switch in redundant mode as transparent as possible to the majority of switch software, the details of setting up primary and secondary connections should be contained in new fabric layer methods. For example, neither PNNI signaling or routing are aware of the redundant data paths that are being created through the switch.

In the receive direction, the netmod method Add_Input_VCC defines a VCC (either permanent or switched). It creates a connection entry in the HDCOMP ASIC of the netmod containing the primary port for the specified connection. This connection entry is used to map a received VP/VC value to a backplane 48 route word, which contains a backplane 48 connection ID and a fabric 46 mask. The fabric 46 mask specifies the fabric or fabrics that should receive data for the specified connection from the passive backplane 48. The backplane 48 route word is prepended to every data when it is transmitted on the passive backplane 48.

A new netmod method is created to define a connection in the receive direction on a netmod that has been configured to operate in redundant mode. It will create the same connection entries in the netmod containing the primary port and in the netmod containing the secondary port. Both connection entries should use the same backplane 48 route word (i.e., backplane 48 connection ID and fabric mask). If the port in the transmit direction is configured to operate in redundant mode, the connection entry should specify both fabrics associated with the specified connection in the transmit direction. The Input Netmod ID is set to the ID of the netmod containing the primary port for the specified connection.

Since a connection is typically bi-directional, the new netmod method will be used twice for a specified connection (if both incoming and outgoing ports are configured to operate in redundant mode), once to receive data on the incoming primary and secondary ports, and once to receive data on the outgoing primary and secondary ports.

In the transmit direction, the netmod method Add_Output creates a connection entry in the fabric driving the netmod containing the primary port. This connection entry is used to map a received backplane 48 connection ID to a ASX200 route word, which contains a netmod connection ID and a netmod mask. The netmod mask specifies the netmod or netmods that should receive data for the specified connection. It also creates a connection entry in the netmod for the primary port. This connection entry is used to map a received netmod connection ID to a set of connection settings, including transmit VP/VC.

A new netmod method is created to define a connection in the transmit direction on a netmod that has been configured to operate in redundant mode. It will create connection entries in the fabric driving the netmod containing the primary port and the netmod for the primary port, and the same connection entries in the fabric driving the netmod containing the secondary port and the netmod for the secondary port. Both UQC connection entries should use the same backplane 48 connection ID and ASX200 route word (i.e., netmod connection ID and netmod mask), and the netmod mask should specify the netmods containing both the primary and secondary ports. Both netmod ASIC connection entries should use the same netmod connection ID and connection settings.

Since a connection is typically bi-directional, the new netmod method will be used twice for a specified connection (if both incoming and outgoing ports are configured to operate in redundant mode), once to transmit data on the outgoing primary and secondary ports, and once to transmit data on the incoming primary and secondary ports.

The following defines the procedures necessary to switch from a primary component to its corresponding secondary component in the event of a primary component failure. If a primary fabric fails, switch the fabric that all affected netmods receive from. If f1 fails, switch n1 and n2 to receive from their secondary fabric f2, and switch n3 and n4 to receive from their primary fabric f2. If f3 fails, switch n5 and n6 to receive from their secondary fabric f4, and switch n7 and n8 to switch from their primary fabric f4. Interrupts from the control port of the failed fabric should be disabled and interrupts from the control port of the corresponding secondary fabric should be enabled. An alarm should also be generated.

If a primary link or port fails, set the switch interface for the corresponding receive secondary port to read, set the switch interface for receive primary port to reset, execute the APS 1+1 bidirectional protocol to inform the other side of the switch from primary to secondary, and generate an alarm. Note that this means that the switchover granularity is at the port level. The switchover of any single port does not cause the switchover of any of the other ports on the same netmod.

If a primary netmod fails, set the switch interface for ALL corresponding receive secondary ports to read, set the switch interface for ALL receive primary ports to reset (if possible), execute the APS 1+1 bi-directional protocol on ALL affected links, and generate an alarm.

When a primary component is replaced and needs to be re-initialized, all of the connection entries from the corresponding secondary component need to be copied to it. This can be done without any affect on the switch's ability to establish new connections.

The above described the procedures for switching from a primary component to its secondary component when an error is detected in the primary component. The following describes the types of errors that are detected.

The APS support in the netmods will detect a variety of soft and hard errors associated with the SONET physical layer and generate interrupts to the controller 52. The types of errors detected and the types of interrupts generated are under software control.

The removal of a fabric 46 or a netmod will generate interrupts to the controller.

A connection entry lookup failure can generate interrupts to the controller. This type of failure may be indicative of memory corruption in either the netmods or the fabric 46. Causing interrupts to be generated because of a connection entry lookup failure is under software control.

In order to detect intermittent fabric 46 failures, the controller will create a loopback connection 50 from the control port of each fabric 46 across that fabric 46 and back to the control port and periodically send itself data over each of these connections. There is a unique VP/VC value for each loopback connection 50.

A loopback connection 50 is installed in each fabric 46 with the VCF__Add__Output method, using a unique backplane 48 routeword and the netmod mask specifying the control port. Packets are sent to the control port with the backplane 48 routeword pretended. See FIG. 3.

Failure to receive data over a specified period on one of these connections or if the data is corrupted is considered to constitute the failure of the fabric 46 associated with that connection. The detection of a fabric 46 failure should occur within 50 msecs, which means that the period for sending packets on each connection should be 10 msecs. With this period, four fabrics may be checked with a total of 400 packets per second. The loopback period and the number of consecutive packets lost before declaring a fabric 46 failure should both be configurable parameters.

The netmod has the ability in the transmit direction to take the data for specific connections from the output queues, immediately prior to the switch interface to a transmit port 22, and turn it around so that it is redirected onto netmod's receive direction. This will allow the creation of loopback connections from the controller 52 to a netmod, allowing the controller 52 to detect netmod failures. See FIG. 4.

In the transmit direction, the method VCF__Add__Output is used to install each loopback connection 50. It creates a connection entry in the UQC ASIC of the fabric 46 driving the netmod containing the given ASIC. This connection entry contains a backplane 48 routeword with a unique backplane 48 connection ID (BPC__ID1), a unique netmod connection ID, and a netmod mask specifying the netmod containing the given ASIC. VCF__Add__Output also creates a connection entry in the given ASIC. This connection entry contains the same netmod connection ID and an indication that data for this connection are to be redirected onto the ASIC's receive direction.

In the receive direction, the method Add__Input__VCC is used to install each loopback connection 50. It creates a connection entry in the HDCOMP ASIC of the netmod containing the given ASIC. This connection entry contains a unique VP/VC value and a backplane 48 routeword with a unique backplane 48 connection ID (BPC__ID2) and a fabric 46 mask that specifies the fabric 46 driving the netmod containing the given ASIC. Note that this backplane 48 connection ID (BPC__ID2) must also be different from the backplane 48 connection ID (BPC__ID1) installed in the UQC ASIC in the previous paragraph.

The method VCF__Add__Output is also used to complete each loopback connection 50. It creates another connection entry in the UQC ASIC of the fabric 46 driving the netmod containing the given ASIC. This connection entry contains a backplane 48 routeword with the same backplane 48 connection ID previously installed in the HDCOMP ASIC (BPC__ID2), and a netmod mask specifying the control port.

Packets for a given loopback connection 50 are sent to the control port with the transmit direction backplane 48 routeword prepended (i.e., with a backplane 48 connection ID of BPC__ID1) and the correct VP/VC value for that connection.

As shown in FIG. 5, there are four fabrics in the switch, each of which drives the transmit direction for two netmods; i.e., fabric 1 (f1) drives netmod 1 (n1) and n2, f2 drives n3 and n4, f3 drives n5 and n6, and f4 drives n7 and n8. In the receive direction, data is received by a given netmod and then transmitted on the passive backplane 48 to which the four fabrics are attached.

For example, if there was a connection between n1 and n6, data received by n1 would be transmitted on the passive backplane 48 and received by f3, which would then route it to n6. Note that there is nothing to preclude data from being received by more than one fabric 46 on the backplane 48; this is required for multicast support.

As shown in FIG. 6, each fabric 46 drives the transmit direction for two netmods as the primary fabric 46 and drives the transmit direction for two netmods as the secondary fabric 46. This is controlled by setting a register on each netmod. The register specifies whether the netmod is to receive from its primary or secondary fabric 46.

The complete set of fabric/netmod interactions is summarized in the following table:

| Fabric | primary netmods | secondary netmods |
|---|---|---|
| f1 | n1, n2 | n3, n4 |
| f2 | n3, n4 | n1, n2 |
| f3 | n5, n6 | n7, n8 |
| f4 | n7, n8 | n5, n6 |

Figure 7:
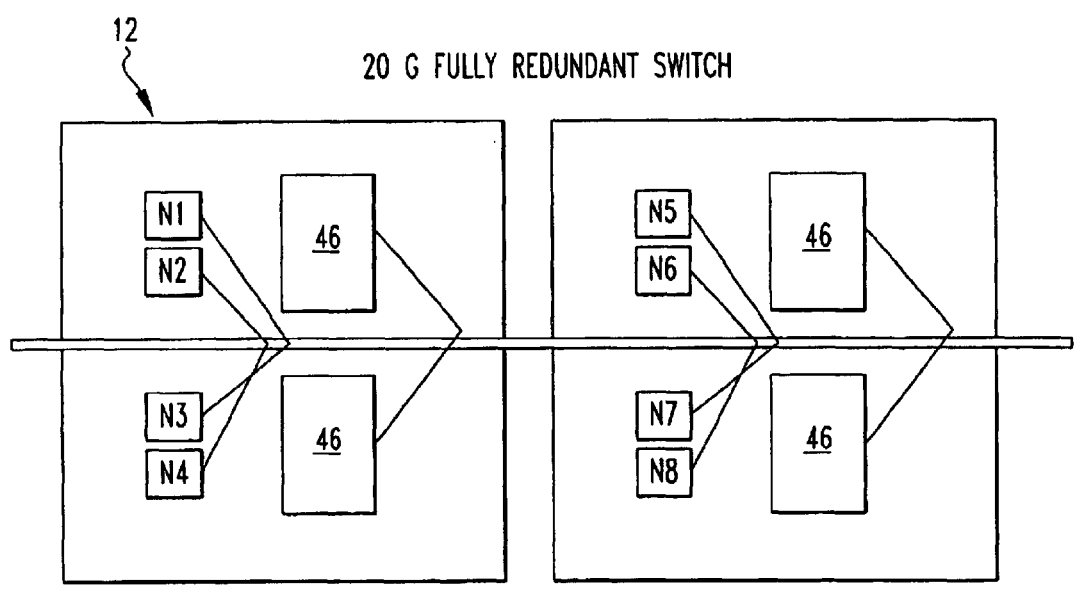
FIG. 7 is a schematic representation of a 20 G fully redundant switch.

This allows a fully redundant switch to be defined in which (f2, n3, n4) acts as a secondary for primary (f1, n1, n2) and (f4, n7, n8) acts as a secondary for (f3, n5, n6). I.e., primary ports on n1 and n2 would have corresponding ports on n3 and n4 as secondaries, and primary ports on n5 and n6 would have corresponding ports on n7 and n8 as secondaries. See FIG. 7.

Note that initially the switch interface for the receive direction of all ports on n3, n4, n7, and n8 would be set in reset mode.

Also, initially (n1, n2) and (n5, n6) are set to receive from their primary fabrics, f1 and f3 respectively, and (n3, n4) and (n7, n8) are set to receive from their secondary fabrics, f1 and f3 respectively.

In order to avoid getting duplicate copies of control port traffic, e.g., signaling messages or PNNI topology updates, the primary SCP should disable interrupts from the control port of each secondary fabric, f2 and f4.

Although the invention has been described in detail in the foregoing embodiments for the purpose of illustration, it is to be understood that such detail is solely for that purpose and that variations can be made therein by those skilled in the art without departing from the spirit and scope of the invention except as it may be described by the following claims.

What is claimed is:

1. A switching system for packets comprising:
a first switch for switching packets having a primary receive port and a secondary receive port; and
a second switch for switching the packets connected to the first switch, said second switch having n receive ports, where n is greater than or equal to 2 and is an integer; m transmit ports, where m is greater than or equal to 2 and is an integer, said transmit ports decoupled from said receive ports; a connecting mechanism that includes a multicast mechanism which sends the packets out a primary transmit port of the m transmit ports to the primary receive port of the first switch to define a primary link, and simultaneously sends the packets out a secondary transmit port of the m transmit ports to a secondary receive port of the first switch to define a redundant link to the primary link so that if there is a failure of the primary link to provide the packets to the first switch, the packets are received by the first switch through the redundant link, said first switch having a mechanism for only accepting the packets from the primary path unless the primary link has failed, in which case the packets are received by the first switch through the redundant link.

2. A system as described in claim 1 wherein the m transmit ports are not aware whether they receive data from a primary or secondary receive port.

3. A system as described in claim 2 wherein the connecting mechanism toggles off the secondary receive port so it discards any data it receives if the primary receive port receives the data in a predetermined state, and toggles off the primary receive port if the data received by the primary receive port is not in a predetermined state or the primary path has failed.

4. A system as described in claim 3 wherein each receive and transmit port are a netmod and wherein the connecting mechanism includes f fabrics, where f is greater than or equal to 1 and is an integer, each fabric driving the transmission of at least 2 netmods.

5. A system as described in claim 4 wherein the connecting mechanism includes a passive backplane connected to each netmod and fabric along which data which is received by a netmod are provided to the fabrics.

6. A system as described in claim 5 wherein each fabric drives the transmit direction for two netmods as primary transmit ports and two netmods as secondary transmit ports.

7. A system as described in claim 6 wherein the connecting mechanism will toggle on the secondary receive port and toggle off the primary receive port if the fabric or netmod is removed from the system or there is a connection entry lookup failure regarding the data connection.

8. A system as described in claim 7 wherein the connecting mechanism detects intermittent fabric failures by creating a loopback connection from each fabric back to itself and sending a test signal across the loopback connection.

9. A system as described in claim 8 including a system controller, and the system controller is unaware that the redundant link is redundant to the primary link.

10. A switch comprising:
    n receive ports, where n is greater than or equal to 3 and is an integer;
    m transmit ports, where m is greater than or equal to 3 and is an integer; and
    a connecting mechanism connected to the receive ports and the transmit ports, said connecting mechanism comprising a controller which can place the connecting mechanism in either a first mode where the connecting mechanism is fully redundant, a second mode where the connecting mechanism is fully non-redundant, or a third mode where the connecting mechanism is partially redundant and partially non-redundant.

11. A switch for switching packets between links comprising:
    n receive ports for receiving the packets from respective associated links, where n is greater than or equal to 2;
    m transmit ports for transmitting the packets to respective associated links, where m is greater than or equal to 2; and
    a connecting mechanism connected to the transmit ports and the receive ports, said connecting mechanism comprising a multicast mechanism and controller which pre-establishes primary paths along which the packets is sent by the multicast mechanism between the transmit ports and receive ports and also pre-establishes redundant paths along which the packets are sent by the multicast mechanism between the receive ports and the transmit ports but only allows the packets associated with a primary path and its corresponding redundant path to cross the connecting mechanism on only the primary path if the primary path is in a predetermined state, and only cross the connecting mechanism on only the redundant path if the primary path is not in the predetermined state, wherein the primary path connects a primary receive port of the receive ports with a primary transmit port and a secondary transmit port of the transmit ports.

12. A system as described in claim 11 wherein the secondary path connects a secondary receive port of the receive ports with the primary transmit port and the secondary transmit port of the transmit ports.

13. A system as described in claim 12 wherein the m transmit ports are not aware whether they receive data from a primary or secondary receive port.

14. A method of switching packets comprising the steps of:
    forming a primary path between a primary receive port and a primary and a secondary transmit port of a switch;
    forming simultaneously with the primary path, a secondary path between a secondary receive port and a primary and a secondary transmit port;
    receiving the packets at the primary receive port and the secondary receive port; and
    transmitting the packets through the primary and secondary transmit ports from a multicast mechanism of the switch.

15. A method as described in claim 14 including after the receiving step, there is the step of discarding the packets received at the secondary receive port.

16. A switching system comprising:
    a first ATM switch for switching packets having a primary receive port and a secondary receive port; and
    a second ATM switch for switching packets connected to the first switch, said second switch having n receive ports, where n is greater than or equal to 2 and is an integer; m transmit ports, where m is greater than or equal to 2 and is an integer, said transmit ports decoupled from said receive ports; a connecting mechanism that includes a multicast mechanism which sends the packets out a primary transmit port of the m transmit ports to the primary receive port of the first switch to define a primary link, and simultaneously sends the packets out a secondary transmit port of the m transmit ports to a secondary receive port of the first switch to define a redundant link to the primary link so that if there is a failure of the primary link to provide the packets to the first switch, the packets are received by the first switch through the redundant link, said first switch having a mechanism for only accepting the packets from the primary path unless the primary link has failed, in which case the packets are received by the first switch through the redundant link.

17. A method of switching packets comprising the steps of:
    forming a primary path between a primary receive port and a primary and a secondary transmit port of an ATM switch;
    forming simultaneously with the primary path, a secondary path between a secondary receive port and a primary and a secondary transmit port;
    receiving packets at the primary receive port and the secondary receive port; and
    transmitting the packets through the primary and secondary transmit ports from a multicast mechanism of the switch.

18. A method as described in claim 17 including after the receiving step, there is the step of discarding the packets received at the secondary receive port.

19. A switching system comprising:

a first switch having a primary receive port and a secondary receive port; and a second switch connected to the first switch, said second switch having n receive ports, where n is greater than or equal to 2 and is an integer; m transmit ports, where m is greater than or equal to 2 and is an integer, said transmit ports decoupled from said receive ports; a connecting mechanism that includes a multicast mechanism which sends data out a primary transmit port of the m transmit ports to the primary receive port of the first switch to define a primary link, and simultaneously sends the data out a secondary transmit port of the m transmit ports to a secondary receive port of the first switch to define a redundant link to the primary link so that if there is a failure of the primary link to provide the data to the first switch, the data is received by the first switch through the redundant link, said first switch having a mechanism for only accepting the data from the primary path unless the primary link has failed, in which case the data is received by the first switch through the redundant link, the m transmit ports are not aware whether they receive data from a primary or secondary receive port, the connecting mechanism toggles off the secondary receive port so it discards any data it receives if the primary receive port receives the data in a predetermined state, and toggles off the primary receive port if the data received by the primary receive port is not in a predetermined state or the primary path has failed, each receive and transmit port are a method and wherein the connecting mechanism includes f fabrics, where f is greater than or equal to 1 and is an integer, each fabric driving the transmission of at least 2 methods, the connecting mechanism includes a passive backplane connected to each method and fabric along which data which is received by a method are provided to the fabrics.

20. A switch for switching data between links comprising:

n receive ports for receiving data from respective associated links, where n is greater than or equal to 2;

m transmit ports for transmitting data to respective associated links, where m is greater than or equal to 2; and a connecting mechanism connected to the transmit ports and the receive ports, said connecting mechanism comprising a multicast mechanism and controller which pre-establishes primary paths along which data is sent by the multicast mechanism between the transmit ports and receive ports and also pre-establishes redundant paths along which the data is sent by the multicast mechanism between the receive ports and the transmit ports but only allows the data associated with a primary path and its corresponding redundant path to cross the connecting mechanism on only the primary path if the primary path is in a predetermined state, and only cross the connecting mechanism on only the redundant path if the primary path is not in the predetermined state, wherein the primary path connects a primary receive port of the receive ports with a primary transmit port and a secondary transmit port of the transmit ports, the secondary path connects a secondary receive port of the receive ports with the primary transmit port and the secondary transmit port of the transmit ports.

21. A method of switching data comprising the steps of:

forming a primary path between a primary receive port and a primary and a secondary transmit port of an ATM switch;

forming simultaneously with the primary path, a secondary path between a secondary receive port and a primary and a secondary transmit port;

receiving data at the primary receive port and the secondary receive port;

transmitting the data through the primary and secondary transmit ports from a multicast mechanism of the switch; and discarding the data received at the secondary receive port.

* * * * *